United States Patent [19]
Zebe

[11] Patent Number: 4,788,716
[45] Date of Patent: Nov. 29, 1988

[54] PUBLIC OPINION POLLING SYSTEM

[75] Inventor: Charles W. Zebe, Stuart, Fla.

[73] Assignee: Bell Communications Research, Inc., Livingston, N.J.

[21] Appl. No.: 136,697

[22] Filed: Dec. 22, 1987

[51] Int. Cl.[4] .......... H04M 11/00; H04M 3/22
[52] U.S. Cl. .......... 379/92; 379/106
[58] Field of Search .......... 379/92, 106, 107, 139, 379/133, 134, 113, 384

[56] References Cited

U.S. PATENT DOCUMENTS

| | | | |
|---|---|---|---|
| 2,875,286 | 2/1959 | Blashfield | 379/133 |
| 2,923,771 | 2/1960 | Avery et al. | 379/92 |
| 3,644,675 | 2/1972 | Watlington | 379/92 |
| 3,909,536 | 9/1975 | Watson et al. | 379/92 |
| 3,943,641 | 3/1976 | Dworetzky | 379/92 |
| 3,950,618 | 4/1977 | de Lemos Bloisi | 379/92 |
| 4,022,977 | 5/1977 | Nomura | 379/107 |
| 4,151,370 | 4/1979 | Root | 379/92 |
| 4,277,648 | 7/1981 | Glassman | 379/140 |
| 4,438,296 | 3/1984 | Smith | 379/92 |
| 4,451,700 | 5/1984 | Kempner et al. | 379/92 |
| 4,584,602 | 4/1986 | Nakagawa | 379/92 |

*Primary Examiner*—Jin F. Ng
*Assistant Examiner*—Wing Fu Chan
*Attorney, Agent, or Firm*—James W. Falk; Lionel N. White

[57] ABSTRACT

A method of conducting a public opinion poll by means of a telephone loop network comprises selecting such a network whose customers are representative of a universe of interest in the subject matter of the poll and soliciting by means of a mass communication medium, such as television, a non-billed manipulation of the telephone instruments of such customers during a prescribed time period in response to a polling question. During the polling period, while instruments of responding customers are placed in an off-hook condition, the normal line-scanning function in the network central office is disabled, thereby allowing electrical current to flow continuously in the network in proportion to the number of customer instruments in the off-hook state. Based upon the previously established electrical resistance of the selected network, a statistical model of the central office distribution plant is utilized to determine the number of off-hook customer instruments, and thereby the preference of the network customers with respect to the polling question.

7 Claims, 2 Drawing Sheets

PUBLIC OPINION POLLING SYSTEM

BACKGROUND OF THE INVENTION

Figure 1:
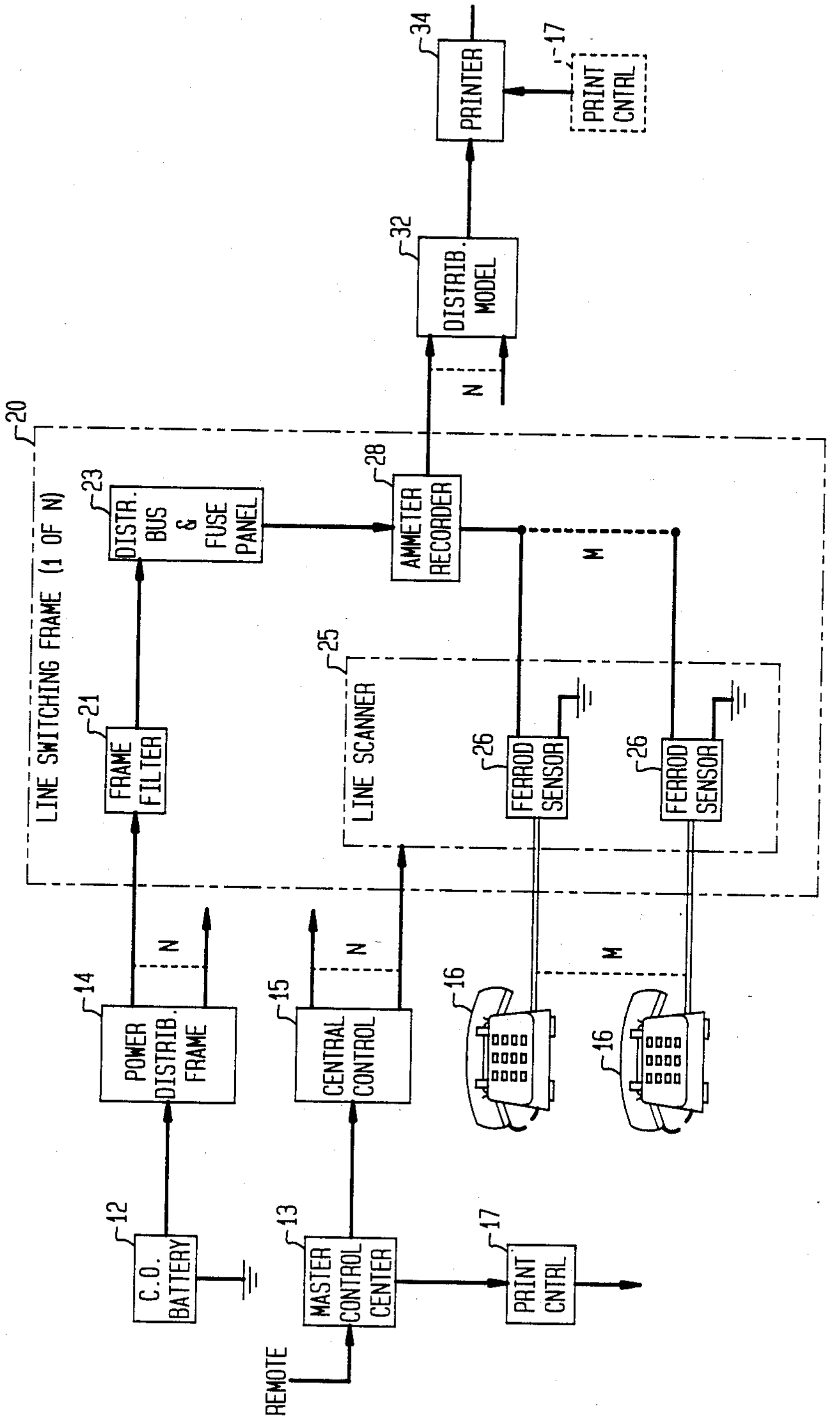

Numerous attempts have been made in the past to achieve a simple, inexpensive system for public opinion polling utilizing the telephone network. Such systems as have been previously proposed have not been successful due to the various associated requirements of installation of special equipment on customer premises, payment of individual charges by customers, and other expensive or intricate demands placed upon the customer or the pollster.

A polling procedure of this type is described, for example, in U.S. Pat. No. 4,151,370, and entails the broadcasting over a mass communication medium, such as radio or television, a polling question with instructions to the listening public who care to participate in the poll to place phone calls to one or another designate number in order to register their opinions. This system requires, however, specialized call answering and tabulating equipment to be put into place at the destination office, and suffers further from the deterrent affects of billing charges being made against participants and call blocking due to simultaneous calling attempts. A truly representative poll is thus often prevented by the reluctance of customers to make the required expenditure, as well as by the numerous premature call terminations due to extended periods of line unavailability.

Other systems, such as that described in U.S. Pat. No. 3,909,536, on the other hand, require that special signaling devices be located with each telephone set in the premises of respective poll participants to enable appropriate responses to broadcast polling queries. The enormous expense involved with the provisioning and installation of such devices is at once apparent, as is the cost of maintaining such equipment for an occasional moment of use.

The need has thus long existed for a polling system which would not require specialized equipment, but could utilize the telephone network elements which are normally in place, and by means of which customers choosing to participate in a broadcast poll might do so without incurring costs or undue expenditures of time. The present invention provides such a system.

SUMMARY OF THE INVENTION

Unlike prior schemes for employing the telephone network as a means of communicating the opinion of a targeted universe of customers in response to a broadcast polling question, the system of the present invention neither requires the installation and maintenance of extensive specialized customer premise or central office equipment, nor does it demand that the customer incur billed charges for participating in a poll. On the contrary, this system makes use of the common telephone set and the normal telephone system functions to enable each participating customer to contribute to an indication of the overall opinion of the polled universe without the necessity of completing a billable call.

The present procedure is based upon elements of the internal line scanning sequences by which customer requests for service are detected in any of various stored program control switches, such as the AT&T electronic switching system-1ESS described in the Bell System Technical Journal, Vol. 63, No. 5, September 1964, currently in common application throughout the telephone system. Rather than placing billable calls to a designated number, participating customers within a preselected universe cumulatively make their presence known, and express their opinions, simply by requesting telephone service in the initial phase of making a call.

As is well known, in the normal practice of placing a call the customer lifts the handset of the telephone from its cradle, or otherwise causes an "off-hook" condition, thereby closing a switch and completing the circuit in the customer loop to allow current to flow in the loop lines. In the 1ESS system, for example, this current flow saturates a ferrite rod (ferrod) associated with the off-hook loop and disables an interrogation pulse sequence, thereby causing the initiation of a dial tone and preparation of the system for the placing of a call by the customer.

In accordance with the system of the invention, however, the usual transfer of the supervision of the developing call from the ferrod to the dial signal receiver is disabled, and the call development is interrupted. Instead, the off-hook current flow is maintained in the customer loop, and in all participating customer loops, during the opinion polling period of about 5-10 seconds. The level of this current is measured and used to calculate ($R=E/I$) the resistance contributed by the participating loops, thus providing an indication of the total number of such loops.

In preparation for the conduct of a poll, a universe of potential poll participants which is demographically representative of a significant interest in the polling question is selected from among the customers of one or more telephone system central offices within the mass medium broadcast area. A statistical model of the distribution plant of the offices serving that universe is then developed on the basis of the known total electrical resistance of all the customer loops in that distribution plant. This model is stored in a processing computer for later use in calculating actual customer participation.

The polling procedure of this invention comprises broadcasting a polling stimulus, such as a question of preference, to at least the selected universe of telephone system customers, and requesting that they designate their concurrence with a specified response by placing their telephones in an off-hook condition, such as by lifting the handset, for the specified polling period at a given signal. During the polling period, the cumulative current flow in the customer loops of the entire universe is measured in the involved central offices, and, based on the statistical model of resistance across the universe, the number of involved loops, and thus the number of participating customers, is calculated.

In order to improve the statistical accuracy of the polling results, a series of current flow measurements may be made at time periods before, during, and after the scheduled polling period to establish the scope of actual participation and to obtain an indication of the use norm of the universe, i.e. the level of initiated calls without polling stimulus, during the time frame of the poll. In addition, since only initiated calls will be indicative of poll participation, the level of calls terminating within the selected universe will be determined and discounted in arriving at the proper tabulation of polling response.

THE DRAWING

Figure 2:
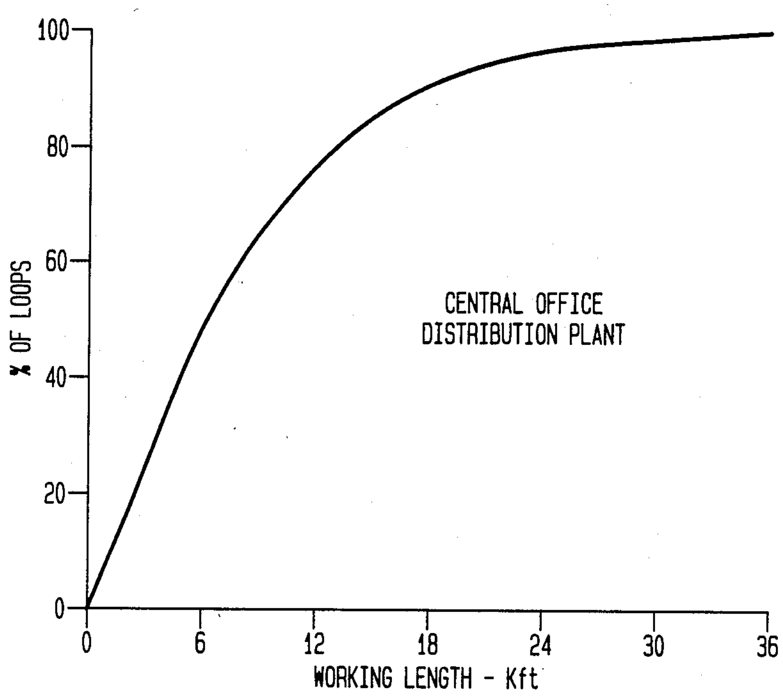

The present invention may be readily seen in the accompanying drawing of which:

FIG. 1 is a block diagram of the polling system of the present invention as implemented in a typical telephone system central office; and FIG. 2 is the distribution curve of the working lengths of loops comprising a typical telephone system central office outside plant.

DESCRIPTION OF THE INVENTION

The implementation of the present polling system in a telephone system begins with a selection of the desired scope of the demographic universe to be encompassed in the planned poll. Depending upon this scope, the one or more telephone system central offices, or portions thereof, serving the customers within the universe are then identified and designated for incorporation in the network to be employed for the poll.

Normally, the polled universe will be represented by at least a plurality of switching frames within a single central office. The operation of the present polling system may be described, therefore, in its simplest form by reference to a single switching frame, as depicted in the block diagram of FIG. 1. It should be appreciated, however, that the processes described as being operative during a polling period are carried out simultaneously in each of a plurality, N, of the switching frames in the designated central offices in order to provide the overall poll results.

In the operation of a typical telephone system employing a stored program switching device, such as the previously mentioned AT&T 1ESS electronic switch, lifting of the handset of a telephone 16 closes a circuit which will allow current to flow from the central office battery 12 through the ferrod sensor 26 associated with the particular telephone involved. The current flow in the ferrod sensor is noted by an interrogation coil, not shown, which in turn signals for the switching of the customer line from the ferrod sensor to a dial signal receiver in preparation for the customer's initiating the number dialing sequence. The flow of current in the ferrod sensor is thus terminated until the next off-hook condition following completion of the present call.

The polling system of this invention utilizes these initial functions of this switching system process in that an off-hook condition in telephone set 16 causes current flow to the relevant line switching frame 20, which is one of a plurality, N, in the central office, by way of the appropriate one of N lines from power distribution frame 14. The current is conducted through the usual frame filter 21 and distribution bus and fuse panel 23 on the switching frame prior to its flowing to line scanner 25 in which is located ferrod sensor 26 for the off-hook line.

Prior to this point in the sequence, however, the interrogation function is disabled on a signal from central control 15 at the direction of master control center 13 which has been alerted from the remote polling center that the polling period has begun. As a result, instead of being terminated in response to an affirmative interrogation cycle, current continues to flow in ferrod sensor 26, and is measured and recorded in ammeter/recorder 28 which has been inserted, according to the invention, into the main conductor line from bus/panel 23. The level of measured current flow may then be used to calculate the resistance of the customer line loop, on the basis of the known voltage of battery 12, and the resistances of the central office elements of the circuit.

With the foregoing single-loop procedure in mind, one may now consider the instant polling process in its actual multi-loop operation through a single central office. The process may be carried on simultaneously, as noted, many times over through numerous central offices; however, its operation will be substantially the same in each, varying only in the results which are dependent upon the particular extra-office loop distribution plant. It is, in fact, this body of distribution data peculiar to an individual central office which establishes this office as the logical functioning unit in the polling process.

The statistical distribution curve of a typical central office outside plant is exemplified in FIG. 2 in terms of the equivalent, or working, length of standard gauge loop wire in place for each of the variously distributed customers served by that central office. On the basis of such a distribution model, and knowledge of the equivalent resistance for each loop in the office network, a statistical determination may be made of the number of customer loops there are in any network circuit of a given resistance. Such a statistical distribution model for an intended universe, or that part to be covered by an involved central office, may be readily derived from the outside plant records of that office in anticipation of its implementation in the polling process.

With the distribution model of the respective central offices in place, for example incorporated into a program of computer 32, the polling process of the present invention will be implemented as follows. From the centralized facilities of the pollster, and in the manner generally employed by earlier polling procedures, the members of the selected universe, as well as others within the range of the broadcast medium utilized, such as radio or television, are advised of the particulars of the imminent poll, which will normally be in the form of a multiple choice enquiry of preference. Contrary to prior practices, however, the participants in the poll are not required to have special equipment on their premises, nor are they requested to complete a phone call, with its resulting charges, to any specified number; rather, they are requested to signify concurrence with a designated preference simply by lifting their respective telephone handsets, or otherwise creating an off-hook condition in their telephone set, for a short period of time, such as 5-10 seconds.

Prior to requesting an actual response from participants in the poll, the pollster, having acquired by previous arrangement remote access to each relevant master control center 13, will call for central control 15 of the central office switch to disable the interrogation functions in each of the line scanners 25 on the plurality, N, of line switching frames 20 involved in the polling process. As noted above, the result of this disablement will be to allow a continuous flow of current to the ferrod sensors 26 associated with each of a multiplicity, M, of telephone sets 16 which are placed in an off-hook condition during the disable period.

In actual practice, after completing the explanation of the polling response procedure to the potential participants, i.e. that receivers be lifted at a given signal from the pollster to signify a specified preference, such as agreement with a stated proposal, or in a preliminary poll to indicate an agreement to participate, the pollster initiates the line scan disable, gives the signal to begin the participants' response, gives a second signal to cause the return of receivers to on-hook condition, and returns the line scan interrogation to normal enabled function. During this polling period, current flowing through all off-hook loops is measured and recorded in each respective meter 28 of the N participating line switching frames. At the completion of the period, the measured current flow levels are indicated to distribution model computer 32 by each of the N plurality of ammeter devices.

The current flow data are then utilized in computer 32 to determine the total electrical resistance of the participating loops, and, by application of the previously established distribution model, to ultimately calculate the number of customers responding to the poll with the prescribed preference. In addition to the noted remote access to aaster control center 13 for the purpose of initiating the line scanner disablement during the polling period, the pollster may also cause center 13 to direct print control 17 to initiate printing of a tabulation of responding central office customer totals at printer 34 for output at the central office, or electronic forwarding to the remote polling site for final compilation.

While the foregoing process provides a statistically reliable indication of the number of loops which have gone off-hook during the short polling period, it should be noted that such off-hook conditions may result from stimuli other than the request of the pollster. For example, a customer within the participating central office network may not be participating personally in the poll, but may be responding to an incoming call, or may be independently initiating an outgoing call. In order to improve the reliability of the poll in the light of these possible variants, it is desirable that these extraneous contributions to the measured results be minimized.

An automatic tabulation of terminating calls during the period of interrogation disablement provides a means for appropriately reducing the registered loop totals, thereby directly eliminating the affect of incoming calls. The number of actual call requests, on the other hand, may be closely estimated by establishing a base level of normal usage of the network during periods immediately preceding and following the active polling interval, utilizing for such purpose the polling method itself. The results of such measurements of non-poll events may readily be applied in the computations at device 32 to provide greater statistical reliability in the ultimate poll product.

The present invention thus provides a method for quickly and economically polling a universe of selected or general demography by means of the public telephone network. Not only does this method avoid a dependence upon cost-intense dedicated polling equipment, but it eliminates the previously common requirement for participants in telephone polling schemes to absorb the charges for phone usage, thus encouraging greater participation leading to more reliable statistical results.

Having now been provided with the details of this invention, those of ordinary skill in the art will appreciate that other embodiments of the invention may become readily apparent from the foregoing description. Such embodiments, however, are nonetheless to be considered as being within the scope of the invention as set out in the appended claims.

What is claimed is:

1. The method of conducting a public opinion poll which comprises:

(a) selecting a demographic universe within which said poll is to be conducted;

(b) identifying the telephone loop network serving said universe;

(c) determining the statistical distribution of the electrical resistance of said loop network;

(d) broadcasting a polling stimulus to at least the members of said universe;

(e) disabling during a polling period the call request initiation function of the switching system serving said loop network;

(f) eliciting from the members of said universe a response to said polling stimuus during said polling period by means of manipulation of their respective telephone sets to attempt the initiation of a call request;

(g) determining the level of off-hook electrical current flow in said loop network during said polling period; and (h) determining from said level of current flow and said resistance distribution the number of loops of said network that were utilized during said polling period for attempted call request initiation, thereby determining the number of said universe members so responding to said polling stimulus.

2. The method of conducting a poll which comprises:

(a) selecting a telephone loop network comprising a switching system normally capable of performing a call request initiation function in response to electrical current flow resulting from an off-hook condition in at least one of the telephone sets of said loop network;

(b) determining the statistical distribution of the electrical resistance of said network among the loops thereof;

(c) broadcasting a polling stimulus to customers served by said telephone loop network;

(d) eliciting from said customers a response to said polling stimulus during a specified polling period by causing an off-hook condition in their respective telephone sets;

(e) disabling said switching system call request initiation function capability during said polling period;

(f) determining the level of electrical current flow in said loop network during said polling period; and (g) calculating from said polling period current flow level and said resistance distribution the number of telephone sets in said network that were in said off-hook condition during said polling period, thereby determining the number of said customers responding to said polling stimulus.

3. The method according to claim 2 which further comprises:

(a) disabling said switching system call request initiation function capability during at least one datum period closely adjacent in time to said polling period;

(b) determining the level of electrical current flow in said loop network during said datum period;

(c) calculating from said datum period current flow level and said resistance distribution the number of telephone sets in said network that were in said off-hook condition during said datum period;

(d) reducing the calculated number of said sets off-hook during said polling period by the calculated number of said sets off-hook during said datum period, thereby determining with greater reliability the number of customers responding to said polling stimulus.

4. A method of conducting a preference poll which comprises broadcasting to a predetermined universe a polling stimulus, eliciting from said universe a specified response to said stimulus by means of the telephone system loop network serving said universe, and establishing from the responses received through said loop network the preference of the universe with respect to said stimulus characterized in that (a) said loop network comprises a switching system normally capable of performing a call request initiation function in response to electrical current flow resulting from an off-hook condition in at least one of the telephone sets of said loop network;

(b) said specified response is the causing of an off-hook condition in a telephone set of said loop network during a specified polling period; and (c) the method of establishing said preference comprises:

(1) calculating the statistical distribution of the network electrical resistance among the loops of said network;

(2) disabling said switching system call request initiation function capability during said polling period;

(3) determining the level of electrical current flow in said loop network during said polling period; and (4) calculating from said polling period current flow level and said resistance distribution the number of telephone sets in said network that were in said off-hook condition during said polling period, thereby determining the number of individuals within said universe responding to said polling stimulus, and thus establishing the preference thereof with respect to said stimulus.

5. A method of conducting a poll according to claim 4 characterized in that said method of establishing said preference further comprises:

(a) disabling said switching system call request initiation function capability during at least one datum period closely adjacent in time to said polling period;

(b) determining the level of electrical current flow in said loop network during said datum period;

(c) calculating from said datum period current flow level and said resistance distribution the number of telephone sets in said network that were in said off-hook condition during said datum period;

(d) reducing the calculated number of said sets off-hook during said polling period by the calculated number of said sets off-hook during said datum period, thereby establishing said preference with greater reliability.

6. A public opinion polling system which comprises means for broadcasting an opinion-educing stimulus to a universe of potential poll participants, and means associated with a public telephone system serving said universe for establishing the extent of response of poll participants signifying an opinion with respect to said stimulus characterized in that (a) said telephone system comprises:

(1) a loop network having a known statistical distribution of electrical resistance among the multiplicity of loops of said network, and (2) a switching system in electrical circuit with said loop network and normally capable of performing a call request initiation function in response to electrical current flow in said circuit resulting from an off-hook condition in at least one of the telephone sets of said loop network; and (b) said response establishing means comprises:

(1) means for disabling said switching system call request initiation function capability during a polling period, (2) means in electrical circuit with said multiplicity of loops for determining the level of electrical current flow in said loop network during said polling period, and (3) means for calculating from said polling period current flow level and said resistance distribution the number of telepone sets in said network that are placed in an off-hook condition during said polling period as a response to said stimulus.

7. A polling system according to claim 6 characterized in that (a) said broadcasting means is activated from a site remote from said switching system;

(b) said switching system disabling means comprises signaling means at said remote site in communication with said switching system; and (c) said polling system further comprises means in electrical circuit with said calculating means for communicating to said remote site the calculated response to said stimulus.

* * * * *